US007338590B1

(12) United States Patent
Shelnutt et al.

(10) Patent No.: US 7,338,590 B1
(45) Date of Patent: Mar. 4, 2008

(54) WATER-SPLITTING USING PHOTOCATALYTIC PORPHYRIN-NANOTUBE COMPOSITE DEVICES

(75) Inventors: John A. Shelnutt, Tijeras, NM (US); James E. Miller, Albuquerque, NM (US); Zhongchun Wang, Albuquerque, NM (US); Craig J. Medforth, Winters, CA (US)

(73) Assignee: Sandia Corporation, Albuquerque, NM (US)

( * ) Notice: Subject to any disclaimer, the term of this patent is extended or adjusted under 35 U.S.C. 154(b) by 309 days.

(21) Appl. No.: 11/256,808

(22) Filed: Oct. 25, 2005

(51) Int. Cl.
*C25B 1/02* (2006.01)
(52) U.S. Cl. ............. 205/628; 205/630; 205/637; 205/638
(58) Field of Classification Search ........ 205/628, 205/630, 637, 638
See application file for complete search history.

(56) References Cited

U.S. PATENT DOCUMENTS

| | | | | |
|---|---|---|---|---|
| 4,176,026 A | * | 11/1979 | Harriman et al. | 204/157.5 |
| 4,382,846 A | | 5/1983 | Gratzel et al. | |
| 4,568,435 A | * | 2/1986 | Shelnutt | 204/157.52 |
| 4,917,784 A | * | 4/1990 | Shelnutt | 204/157.6 |
| 6,603,070 B2 | | 8/2003 | Lindsey et al. | |
| 7,132,163 B1 | * | 11/2006 | Shelnutt et al. | 428/402 |
| 7,223,474 B1 | * | 5/2007 | Shelnutt et al. | 428/403 |
| 2005/0164297 A1 | * | 7/2005 | Chen et al. | 435/7.1 |
| 2006/0118496 A1 | * | 6/2006 | Nuttall et al. | 210/748 |

OTHER PUBLICATIONS

Akihiko Kudo, Hideki Kato and Issei Tsuji, "Strategies for the Development of Visible-light-driven Photocatalysts for Water Splitting" The Chemical Society of Japan, Chemistry Letters, 2004, vol. 33. No. 12. pp. 1534-1539.
Gopal K. Mor et al, "Enhanced Photocleavage of Water Using Titania Nanotube Arrays", Nano Letters (2005) vol. 5 No. 1 pp. 191-195.
Kazuhiro Sayama, et al "Stoichiometric water splitting with $H_2$ and $O_2$ using a mixture of two different photocatalysts and an $IO_3^-/I^-$ shuttle redox mediator under visible light irradiation", The Royal Society of Chemistry, 2001, pp. 2416-2417.
Kazuhiro Sayama, et al, "Photoelectrochemical decomposition of water on nanocrystalline BiVO4 film electrodes under visible light", The Royal Society of Chemistry, 2003, pp. 2908-2909.
Zhigang Zou, et al, "Direct splitting of water under visible light irradiation with an oxide semiconductor photocatalyst", Letters to Nature, 2001, vol. 414, pp. 625-627.
Meng Ni et al, "A review and recent developments in photocatalytic water-splitting using $TiO_2$ for hydrogen production", http://www.sciencedirect.com/science?_ob=ArticleURL&_udi=B6VMY-4FVC9VX-1&_user=1550512&_coverDate=04%2F09%2F2005&_alid=32549572&_rdoc=3&_fmt=summary&_orig=search&_cdi=6163&_sort=d&_st=4&_docanchor=&_acct=C000053660&_version=1&_urlVersion=0&_userid=1550512&md5=1e12a32cd7b413a94afad9787c83a564.

* cited by examiner

*Primary Examiner*—Bruce F. Bell
(74) *Attorney, Agent, or Firm*—Carol I. Ashby (57) ABSTRACT

A method for generating hydrogen by photocatalytic decomposition of water using porphyrin nanotube composites. In some embodiments, both hydrogen and oxygen are generated by photocatalytic decomposition of water.

27 Claims, 6 Drawing Sheets

WATER-SPLITTING USING PHOTOCATALYTIC PORPHYRIN-NANOTUBE COMPOSITE DEVICES

The United States Government has rights in this invention pursuant to Department of Energy Contract No. DE-AC04-94AL85000 with Sandia Corporation.

RELATED PATENT APPLICATIONS

A co-pending, related patent application Ser. No. 11/001,468 entitled "Heteroporphyrin Nanotubes and Composites" has been filed on Dec. 1, 2004.

BACKGROUND OF THE INVENTION

There is a need for an energy-efficient way to generate hydrogen from water.

Mor and coworkers report the use of highly ordered titania nanotube arrays of variable wall thickness to photocleave water under ultraviolet irradiation (G. K. Mor et al., "Enhanced Photocleavage of Water Using Titania Nanotube Arrays," Nanoletters 5 (2005) p. 191-195). Visible-light-driven photocatalysts have been developed through band engineering by doping of metal cations into oxide semiconductors (A. Kudo, H. Kato, and I. Tsuji, "Strategies for the Development of Visible-light-driven Photocatalysts for Water Splitting," Chem. Lett. 33 (2004) p. 1534-1539, and Z. Zou et al., "Direct splitting of water under visible light irradiation with an oxide semiconductor photocatalyst," Nature 414 (2001) p. 625-627) and by making solid solutions between ZnS and narrow band gap semiconductors (A. Kudo, H. Kato, and I. Tsuji, "Strategies for the Development of Visible-light-driven Photocatalysts for Water Splitting," Chem. Lett. 33 (2004) p. 1534-1539). A nanocrystalline $BiVO_4$ film electrode on conducting glass has been used for the decomposition of water under visible light (K. Sayama et al., "Photoelectrochemical decomposition of water on nanocrystalline $BiVO_4$ film electrodes under visible light," Chem. Comm. 2003 (2003) p. 2908-2909). The stoichiometric splitting of water into $H_2$ and $O_2$ under visible light irradiation has been performed using a mixture of $Pt-WO_3$ and $Pt—SrTiO_3$ (Cr—Ta-doped) photocatalysts and an $IO_3^-/I^-$ shuttle redox mediator (K. Sayama et al., "Stoichiometric water splitting into $H_2$ and $O_2$ using a mixture of two different photocatalysts and an $IO3^-/I^-$ shuttle redox mediator under visible light irradiation," Chem. Commun. 2001 (2001) p. 2416-2417).

Lindsey and Loewe (U.S. Pat. No. 6,603,070) reports the synthesis of light harvesting rods comprising covalently coupled porphyrinic macrocycles. Light harvesting arrays and solar cells containing the light harvesting rods are also described.

Gratzel, Kiwi, Kalyanasundaram, and Philp (U.S. Pat. No. 4,382,846) reports a method for the simultaneous production of hydrogen and oxygen from water by the visible light irradiation of a water solution containing photosensitizer, an electron relay, and a suitable combination of redox catalysts.

SUMMARY OF THE INVENTION

This invention relates to a method for generating hydrogen by photocatalytic decomposition of water using porphyrin nanotube composites. In some embodiments, both hydrogen and oxygen are generated by photocatalytic decomposition of water.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a method for photocatalytically generating hydrogen from water using a self-assembled nanoscale device. The nanodevices employed in different embodiments of this invention use light to produce hydrogen gas by splitting water using porphyrin nanotubes as light-harvesting nanostructures to generate free electrons that reduce water molecules of positively charged hydrogen ions to neutral hydrogen. In some embodiments, both hydrogen gas and oxygen gas are formed through two photocatalytic reactions coupled electrically within the nanodevice. The water-splitting nanodevices used in embodiments of this method comprise photocatalytic porphyrin nanotubes made by ionic self-assembly of oppositely charged porphyrin subunits; some embodiments of the formation of these nanotubes are described in the related U.S. patent application Ser. No. 11/001,468 entitled "Heteroporphyrin Nanotubes and Composites," which is incorporated herein by reference.

Embodiments of this invention employ porphyrin nanotubes that can be prepared by ionic self-assembly of two oppositely charged porphyrins in aqueous solution. The term porphyrin is used to include porphyrins, termed unreduced porphyrins, and hydroporphyrins, termed reduced porphyrins, such as, for example, chlorins, bacteriochlorins, and isobacteriochlorins. The charged porphyrins assemble by rapid ionic self-assembly to form multimolecular subunits.

The multimolecular subunits then aggregate more slowly to form the nanotubes. The nanotubes represent a new class of porphyrin nanostructures whose structural and functional characteristics can be varied by proper selection of the molecular building blocks (tectons) used to form the nanostructure.

The porphyrin nanotubes are formed by ionic self-assembly of oppositely charged porphyrin molecules. The electrostatic forces between these porphyrin constituents promote the structural stability of these nanostructures. The multimolecular subunits formed from the combination of both positively and negatively charged porphyrins, including metalloporphyrins, provide the basic building blocks for the formation of the nanotube. Additional intermolecular interactions that can contribute to the structural stability include van der Waals forces, hydrogen bonding, axial coordination, and other weak intermolecular interactions. Molecular recognition of the complementary arrangements of the charges and H-bond donor/acceptors of the porphyrin guide the formation of the multimolecular subunits. The pH of the solution is important for providing the appropriate level of protonation of substituents of the porphyrins and of ligands bound to the metal ion in metalloporphyrins, such as, for example, hydroxyl groups, pyridyl groups, and bound water molecules. Formation of multimolecular subunits and their subsequent self-assembly into the nanotubes can be controlled by proper selection of the specific porphyrin constituents, the pH, and the solvent.

The porphyrin nanotubes are hollow structures possessing uniform size and shape for a given pair of cationic and anionic porphyrins. The nanotubes are photocatalytic, mechanically responsive and adaptive to light, and they have other interesting electronic and optical properties, some of which mimic properties of the chlorosomal nanorods.

Porphyrin nanotubes can be formed by mixing aqueous solutions of the two or more porphyrin species with some porphyrin species being positively charged and others being negatively charged. The solvent of the aqueous solution can be water or its mixture with some other polar organic solvents, such as methanol, ethanol, acetonitrile, tetrahydrofuran, dimethyl formamide, and dimethyl sulfoxide.

In one synthetic process for forming the nanotubes, 9 mL of freshly acidified $H_4TPPS_4^{2-}$ solution (10.5 μM $H_4TPPS_4^{2-}$, 0.02 M HCl) was mixed with 9 mL of Sn(IV) tetrakis(4-pyridyl)porphyrin ($SnTPyP^{2+}$) dichloride in water (3.5 μM $SnTPyP^{2+}$). The mixture, which had a pH of 2, was left in the dark at room temperature for 72 h. While porphyrins of a single charge type generally exhibit negligible aggregation under these conditions (pH 2) within 5 hours, the mixture of both positively and negatively charged porphyrins immediately forms colloidal aggregates, which over a period of time self-organize into nanotubes with a high yield (approximately 90%).

The nanotubes comprise hollow tubular structure with open ends. TEM images and optical spectral results are consistent with a structure composed of stacks of offset J-aggregated porphyrins (individual porphyrins are approximately 2×2×0.5 nm) in the form of cylindrical lamellar sheets. The lamellar structure would be similar to an architecture proposed for the stacking of bacteriochlorophyll molecules in the chlorosomal rods. X-ray diffraction studies exhibit peaks in the low- and high-angle regions with peak widths suggesting moderate crystallinity.

The composition of the nanotubes was determined by UV-visible absorption spectroscopy and energy dispersive X-ray (EDX) spectroscopy. The filtered nanotubes were dissolved at pH 12 and the ratio of the porphyrins was determined by spectral simulation using extinction coefficients for $H_2TPPS_4^{4-}$ ($\epsilon_{552}$=5500 $M^{-1}$-$cm^{-1}$) and $Sn(OH)_2TPyP$ ($\epsilon_{551}$=20200 $M^{-1}$-$cm^{-1}$), giving an approximate molar ratio of 2.4$H_2TPPS_4^{4-}$ per $Sn(OH)_2TPyP$. EDX measurements of the S:Sn atomic ratio of the porphyrin tubes on the TEM grids also indicate a molar ratio of between 2.0 and 2.5. The observed ratio of the two porphyrins in the tubes (2.0-2.5) can be related to the charges of the porphyrin species present at pH 2. As shown by titrations monitored by UV-visible spectroscopy, the porphyrin species present at pH 2 are $H4TPPS_4^{2-}$ and a mixture of $Sn(OH)_2TPyP^{4+}$ and $Sn(OH)(H_2O)TPyP^{5+}$ (formed by protonation of the pyridine substituents of $Sn(OH)_2TPyP$ and, in the latter species, by the additional replacement of one $OH^-$ axial ligand with $H_2O$ at low pH). The formation of the nanotubes depends on the pH (e.g., not formed at pH 1 or 3), as expected because the charge balance of the ionic porphyrins depends on their protonation state. EDX spectra of the nanotubes also showed no evidence of significant amounts of Cl (or I when HI was used in place of HCl), precluding the presence of chloride as counter ions, axial ligands, or salt bridges. As expected for a nanostructure formed by ionic self-assembly, the same ratio of porphyrins (2.0-2.5) is observed in the nanotubes regardless of the initial ratio of the two porphyrins in solution.

By altering the molecular structure of the porphyrins, the dimensions of the nanotubes can be controlled. For example, by using Sn tetra(3-pyridyl)porphyrin instead of Sn tetra(4-pyridyl)porphyrin, nanotubes with significantly smaller average diameters were obtained (35 nm instead of 60 nm). Changing the tin porphyrins subtly repositions the charge centers and the associated H-bond donor atoms on the pyridinium rings, changing the inter-porphyrin interactions sufficiently to alter the diameter while still allowing the tubes to form. Nanotubes are not produced when the 2-pyridyl porphyrin is used, presumably because the location of the functional nitrogen atom is changed too drastically. Axial ligation of a porphyrin is also important as tubes are obtained when the Sn(IV) complex is replaced with other potentially six-coordinate metal ions, for example, $Fe^{3+}$, $Co^{3+}$, $TiO^{2+}$, $VO^{2+}$, but not when a metal that does not add axial ligands, for example, $Cu^{2+}$, or the metal-free porphyrin is used. These results illustrate the possibility of achieving control over the structure of the nanotubes by suitable structural modifications of the porphyrins, including variation of the peripheral substituents of the porphyrin, the metal contained in the porphyrin core, and the nature of the axial ligands.

The nanotubes exhibit interesting and potentially useful properties. For example, the porphyrins in the nanotubes are stacked in a manner that gives UV-visible absorption bands at 496 and 714 nm that are red-shifted from the corresponding bands of the monomeric porphyrins. These bands indicate formation of J-aggregates similar to those of $H_4TPPS_4^{2-}$ and other porphyrins, but the bands of the nanotubes are broader. As a result, the nanotubes exhibit intense resonant light scattering from these J-aggregate bands, making the nanotube suspension appear bright green under intense white light illumination, but light greenish yellow in weak transmitted light. In addition, the strong fluorescence of the porphyrin monomers is almost entirely quenched in the nanotubes.

Some metalloporphyrins, for example, the Sn(IV) porphyrins, are known to be good photocatalysts in homogeneous solutions. Porphyrin nanotubes with constituent tin porphyrins exhibit useful photocatalytic activity. This has been demonstrated in two processes where the photoreduction of aqueous metal complexes has been used to form metal nanostructures using the porphyrin nanotubes as structural templates. The two types of metal salts employed to demonstrate this invention in these two embodiments are Au(I) complexes and Pt(II) complexes. The photocatalytic reduction reaction mediated by Sn(IV) porphyrins in homogeneous solutions is described for reduction of a Au(I) complex by the following simplified cyclic reactions:

where ED=electron donor, * indicates a photoexcited state of the porphyrin, •− indicates the porphyrin radical ion, $ED_{ox}$ is the oxidized form of the electron donor, and $M_+$ and $M^0$ indicate the metal ion and reduced metal, respectively. Typical examples of electron donors include but are not restricted to ascorbic acid, ethylene diamine tetra-acetic acid (EDTA) in varying degrees of protonation, triethylamine, triethanolamine, benzenethiol, 2-mercaptoethanol, and nitrite ions.

In some syntheses, Au(I) thiourea or Au(I) thiosulfate complexes were used with ascorbic acid as the electron donor (ED). These reductions are predominately photocatalytic, unlike those for many other gold complexes that may also involve chemical and photochemical reduction. The photochemical reduction is prevented by the higher stability of the Au(I) complexes relative to Au(III) complexes and their transparency to visible light. Autocatalytic growth of gold is negligible.

Figure 2:
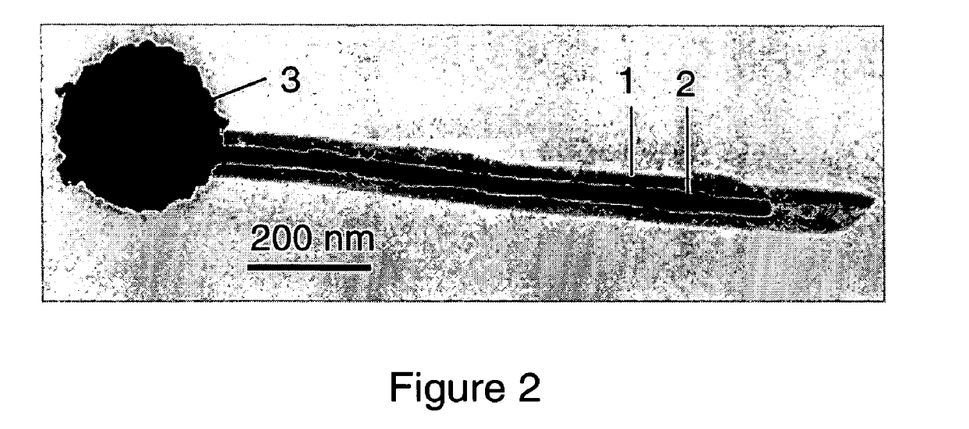
FIG. 2 is a transmission electron micrograph (TEM) image of a porphyrin nanotube with a gold core and a gold protuberance at one end of the nanotube.

The Sn-porphyrin-containing nanotubes used in the metallization reactions were prepared as described above. The tubes can be several micrometers in length and have diameters typically in the range of 50-70 nm with approximately 20-nm thick walls. When the nanotubes are used to photoreduce the positively charged Au(I)-thiourea complex, the metal is deposited exclusively within the hollow interior of the nanotubes, forming a continuous polycrystalline gold nanowire that is of the same diameter as the tube core, as shown in FIG. 2. The nanowires can be terminated at one end of the nanotube with a gold ball that is generally of larger diameter than the tube. The diameter of the nanorod is determined by the inner diameter of the hollow porphyrin nanotube. The diameter of the ball can vary from about the same diameter as the nanotube to much larger. Nanoball diameters up to 800 nm have been demonstrated and larger-diameter nanoballs are possible, depending on the reaction conditions and growth time after the nanogrowth emerges from the interior of the nanotube.

Selection of a negatively charged gold complex can produce a different nanostructure. For example, the reduction of the negatively charged Au(I) thiosulfate complex produces gold particles primarily on the outer surfaces of the tubes. These results show that the electrostatic and other interactions between the complex and the tube surfaces can control where the metal is deposited and that the location of the metal deposition is different for the two oppositely charged complexes. Directional electron/energy transport within the tube walls can also play a role in determining where the metal is deposited.

In one process, gold solutions for the photocatalytic deposition of gold were freshly prepared by reducing Au(III) to Au(I) with thiourea (V. Gaspar, A. S. Mejerovich, M. A. Meretukov, and J. Schmiedl, *Hydrometallurgy*, 1994, 34, 369). Typically, 17 mg of thiourea powder was slowly added to 1 ml of $HAuCl_4$ solution (20 mM) and the mixture agitated to dissolve the thiourea. After a few minutes, the yellow Au(III) solution turned into a transparent and colorless solution of $Au(I)(thiourea)_x$ complex. To grow the Au nanostructure, 50 µl of $Au(I)(thiourea)_x$ solution (20 mM Au) and 50 µl of ascorbic acid solution (0.2 M) were added to a 2-ml glass vial containing 1 ml of the nanotube colloidal suspension ($SnTPyP^{2+}$ concentration 1.75 µM). The reaction mixture was swirled to homogenize the solution, placed in a glass water bath to control the temperature, and then irradiated with incandescent light (800 nmol $cm^{-2}$ $s^{-1}$) for 8 minutes. No gold deposition was observed in control experiments without light exposure or in the absence of the porphyrin nanotubes.

The continuous nature of the nanowire and the formation of the ball at the end of the tube suggest a novel mechanism for its formation by the nanotube. The continuity of the wire implies a single nucleation site on the inner surface with mobile electrons generated in the tube flowing into the wire at that site. Thus, under illumination, the tube acts as a photoelectrochemical cell, charging up the growing nanowire at a potential negative enough to reduce the gold complex at gold surfaces accessible to the complex. When the wire reaches the end of the tube it expands into the ball where most of the electrons will collect. The J-aggregate composition of the tube walls indicates strong electronic coupling of multiple porphyrin subunits, which might be expected to facilitate electron transport necessary to grow the nanowire.

Figure 3:
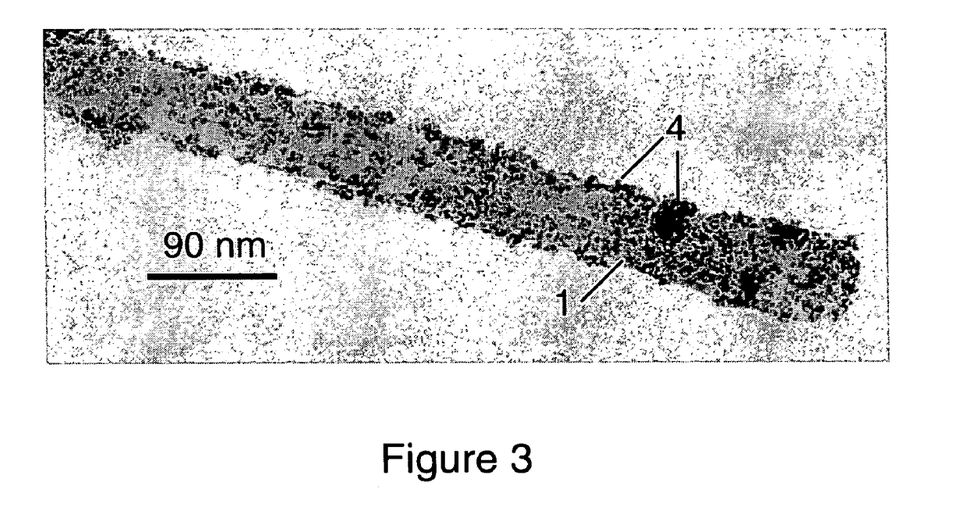
FIG. 3 is a TEM image of a porphyrin nanotube coated with Pt nanoparticles.

Platinum metal can be grown onto the nanotube surfaces as illustrated in FIG. 3. Photocatalytic initiation of growth by photoreduction of the platinum complex occurs with the nanotubes to produce small Pt seed nanoparticles. These seed particles decorate mainly the outer surfaces of the porphyrin nanotubes. Normally, fast autocatalytic reduction of Pt occurs after the seed particle reaches a certain size, producing a Pt dendrite.

Figure 6:
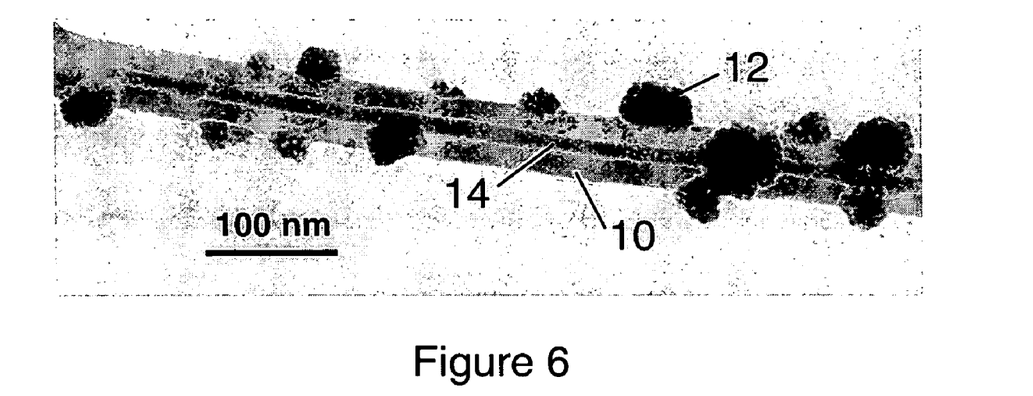
FIG. 6 is a TEM image of a porphyrin nanotube with Pt inside the porphyrin nanotube core and with Au nanodendrites on the outer surface.

At higher Pt concentrations, it is possible to grow one or more Pt dendrites or columns of Pt nanoparticles within the hollow interior of the nanotube, as shown in FIG. 6. The concentrations of the Pt complex and ascorbic acid were 1 and 10 mM, respectively. Exposure times were 15 minutes. The concentrations of the nanotubes were the same for both reactions. Composites with both filled cores and large platinum dendrites on the outer surface can also be produced at high Pt ion concentration and longer light exposure times.

In one process for the deposition of platinum, $K_2PtCl_4$ stock solution (20 mM Pt) and ascorbic acid stock solution (0.2 M) were added to a 2-ml glass vial containing 1 ml of the nanotube colloidal suspension ($SnTPyP^{2+}$ concentration 1.75 µM). The reaction mixture was swirled to homogenize the solution, placed in a glass water bath to control the temperature, and then irradiated with incandescent light (800 nmol $cm^{-2}s^{-1}$). When a low concentration of platinum salt (0.1 mM) was used in the reaction, 5 µl of $K_2PtCl_4$ stock solution and 5 µl of ascorbic acid stock solution were added and the light exposure time was 15 min. When a high concentration of platinum salt (1 mM) was employed in the reaction, 50 µl of $K_2PtCl_4$ stock solution and 50 µl of ascorbic acid stock solution were added and the light exposure time was 15 or 35 min. The porphyrin concentration was essentially the same for all the reactions (1.75 µM $SnTPyP^{2+}$).

It is possible to construct metallic nanostructures that comprise one metal within the nanotube and different metal on the outer surface of the nanotube. As shown in FIG. 6, a Pt core is formed within the nanotube and Au dendrites are grown on the surface of the nanotube. This was accomplished by growing the Pt as follows: 100 µl K$_2$PtCl$_4$ solution (20 mM in Pt) and 100 µl of 0.2 M ascorbic acid solution were added to a 2-ml glass vial containing 1 ml of the nanotube colloidal suspension (SnTPyP$^{2+}$ concentration 1.75 µM). The reaction mixture was mixed to homogenize the solution, placed in a water bath to control the temperature, and irradiated with incandescent light (800 nmol cm$^{-2}$ s$^{-1}$) for 11 min. The suspension was centrifuged at 2000 rpm for 2 minutes. The supernatant liquid was removed and 1 ml of 0.01 M HCl was added. Following mixing to obtain a relatively homogeneous suspension, 100 µl of 0.2M ascorbic acid solution and 100 µl of 20 mM Au(I) thiourea$_x$ complex were added. The reaction mixture was mixed to homogenize the solution, placed in a water bath to control the temperature, and irradiated with incandescent light (800 nm cm$^{-2}$ s$^{-1}$) for 9 minutes.

Figure 4:
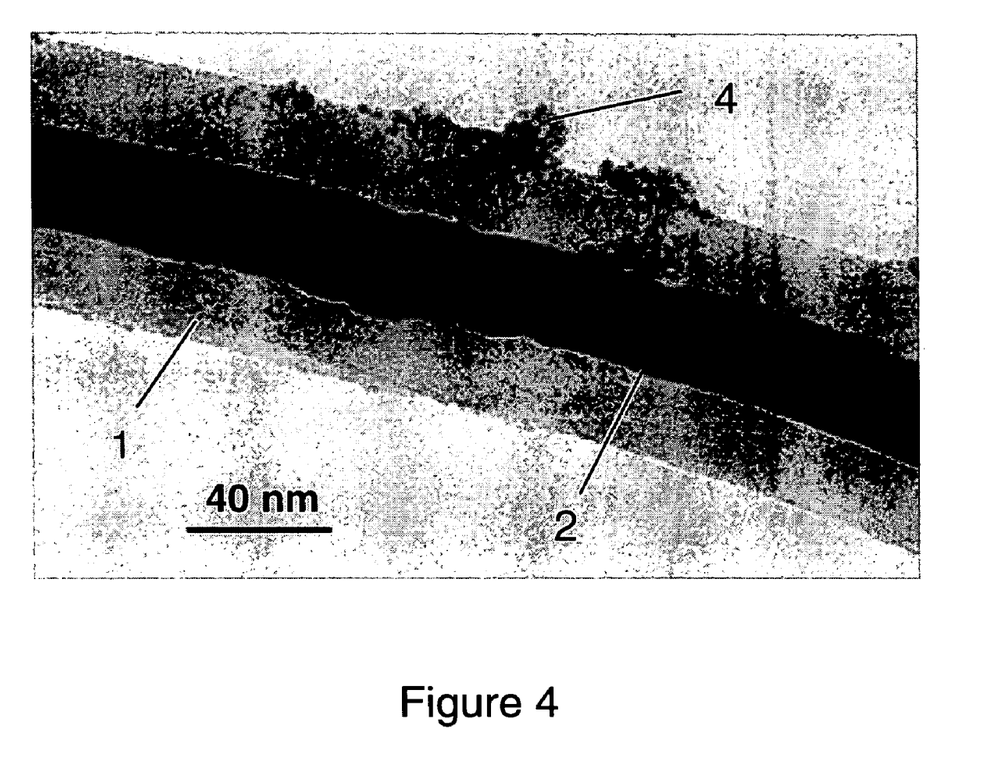
FIG. 4 is a TEM image of a porphyrin nanotube containing a Au wire inside the nanotube core and having Pt nanoparticles on the outer surface.

Composite structures with Au interior wires and Pt nanoparticles on the outer surface of the nanotube can be made, as shown in FIG. 4. In one such embodiment, 50 µl of 20 mM Au(I) thiourea$_x$ complex and 100 µl of 0.2 M ascorbic acid were added to a 2-ml glass vial containing 1 ml of the nanotube colloidal suspension (SnTPyP$^{2+}$ concentration 1.75 µM). The reaction mixture was mixed to homogenize the solution, placed in a water bath to control the temperature, and irradiated with incandescent light (800 nmol cm$^{-2}$s$^{-1}$) for 6 min. The suspension was centrifuged at 1500 rpm for 1 min. The supernatant liquid was removed. One milliliter of Pt nanoparticle colloidal suspension prepared according to the literature (Brugger, P. A.; Cuendet, P.; Gratzel, M. *J. Am. Chem. Soc.* 1981, 103, 2923-2927) and 10 µl of 1 M HCl were added; the resulting suspension was mixed to achieve relative homogeneity. The mixed suspension was kept in the dark overnight while the Pt nanoparticles adsorbed onto or bound to the porphyrin nanotube outer surface.

The preceding syntheses illustrate the formation of the metal nanowires and metallic reduction catalysts using Au(I) and Pt(II) ions. Different metal nanowires and reduction catalysts can also be prepared with metals that have reduction potentials compatible with the potential provided by the photoreduced metalloporphyrin incorporated within the nanotube. Examples include but are not restricted to Ag(I) ions, Pd ions, Ni ions, Cu ions, Co ions, Fe ions, Rh ions, Pb ions, oxides of Ru, Cr, and U, and Se(IV), for example, as in SeO$_3^{2-}$.

Examples of porphyrins useful for making the porphyrin nanotubes employed in the method of this invention include but are not restricted to Co(III) meso-tetrakis(4-pyridyl) porphyrin, Fe(III) meso-tetrakis(4-pyridyl)porphyrin, Sb(IV) meso-tetrakis(4-pyridyl)porphyrin, Sn(IV) meso-tetrakis(4-pyridyl)porphyrin, TiO meso-tetrakis(4-pyridyl)porphyrin, VO meso-tetrakis(4-pyridyl)porphyrin, Co(III) meso-tetrakis(3-pyridyl)porphyrin, Fe(III)meso-tetrakis(3-pyridyl)porphyrin, Sb(IV) meso-tetrakis(3-pyridyl) porphyrin, Sn(IV) meso-tetrakis(3-pyridyl)porphyrin, TiO meso-tetrakis(3-pyridyl)porphyrin, VO meso-tetrakis(3-pyridyl)porphyrin, and tetrakis(4-sulfonatophenyl) porphyrin. The photocatalytic properties of the nanotubes can be used in self-metallization reactions to generate the metal components employed for hydrogen evolution and to generate the metal interconnects between the hydrogen-generating and oxygen-generating components of the water-splitting nanodevice in some embodiments.

Figure 1:
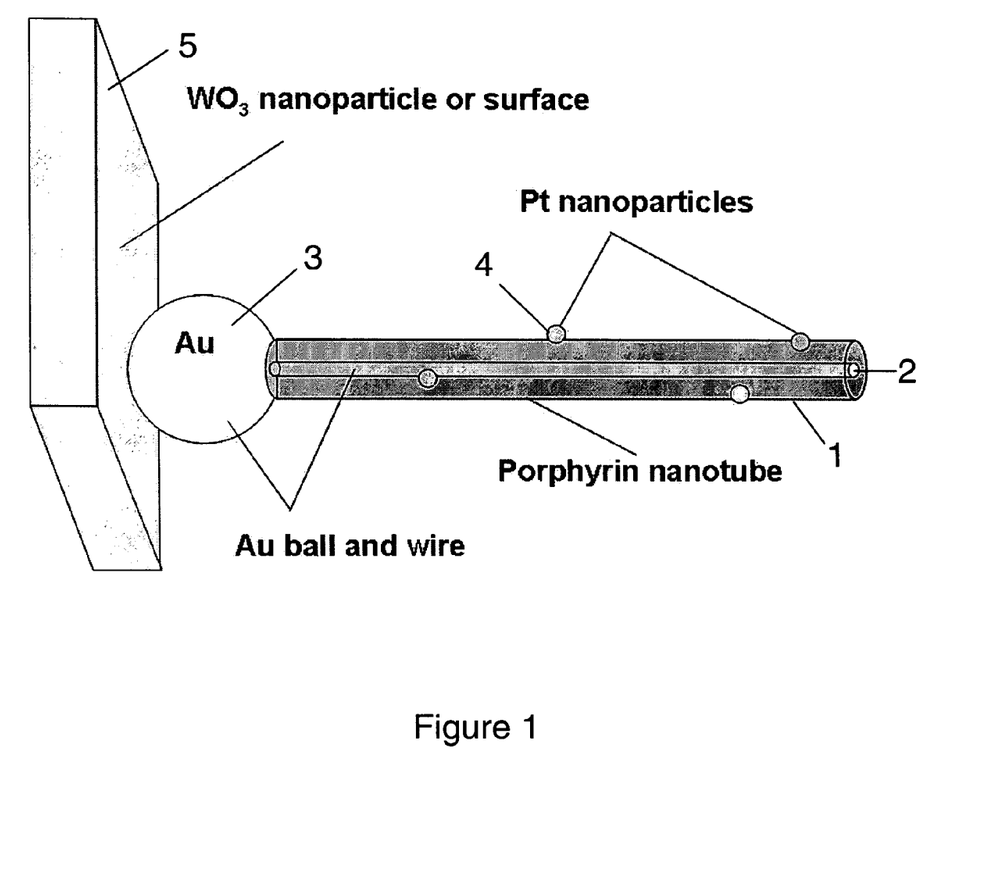
FIG. 1 illustrates an embodiment comprising a porphyrin nanotube with a metallic reduction catalyst on the outer surface, a metal nanorod within the nanotube core, and a metal protuberance for electrically connecting the nanotube composite to an oxidation catalyst.

An example of a composite nanostructure employed in some embodiments of this invention is illustrated in FIG. 1. Components are present in this embodiment that perform the steps of light collection and charge generation, charge separation, charge transport, and photocatalysis for water splitting. The porphyrin nanotube 1 comprises an assembly of multiple wavelength absorbers, for example, at least two different porphyrin tectons (a tecton is a porphyrin molecular building block used to form the nanostructure). The porphyrin nanotube is capable of performing electron transfer. This enables the growth of a metal wire 2 within the core of the porphyrin nanotube. A metal protuberance 3 can be grown at an end of the nanotube when a growing metal wire reaches the end of the nanotube. The metal wire serves as a conductor that facilitates charge separation and thereby reduces carrier loss through rapid recombination. The porphyrin nanotube/metal wire composite therefore displays improved efficiency in light harvesting and charge separation. FIG. 2 is an transmission electron micrograph (TEM) of a porphyrin nanotube composite showing the porphyrin nanotube 1, metal deposit 2 in the core of the nanotube, and metal protuberance 3 at one end of the nanotube. Photocatalytic growth using photoexcitation of the porphyrin nanotube in the presence of a reducible metal precursor such as, for example, Au(I) thiourea, and an electron donor such as, for example, ascorbic acid results in growth of the gold wire preferentially within the core of the porphyrin nanotube rather than on the outer surface.

A reduction catalyst 4 is affixed to the surface of the porphyrin composite. In FIG. 1, one embodiment of the invention using Pt nanoparticles as the reduction catalyst is illustrated. Other metals that can serve as the reduction catalyst include, but are not restricted to, Pd, Co, Ni, and alloys thereof. Other nonmetallic reduction catalysts such as, for example, a tethered enzyme such as a hydrogenase or a nitrogenase can be used. There are a variety of reactions that can be employed to tether the enzyme. One example is the synthesis of porphyrin-lysine(protein) hybrids of proteins by formation of sulfonamide linkages using activated sulfonylester substituents on the porphyrin. Two examples of porphyrins containing such substituents are 5-(4-(pentafluorophenyl)sulfonate)-10,15,20-tris(4-sulfonatophenyl) porphyrin and 5-(4-(succinimidyl)sulfonate)-10,15,20-tris (4-sulfonatophenyl)porphyrin. FIG. 3 is a TEM of a porphyrin nanotube 1 with Pt nanoparticles as the reduction catalyst 4 affixed to the surface of the nanotube. FIG. 4 is a TEM of a porphyrin nanotube 1 with a metal deposit 3 of Au within the core of the nanotube and a reduction catalyst 4 of Pt nanoparticles on the outer surface of the nanotube.

Figure 5:
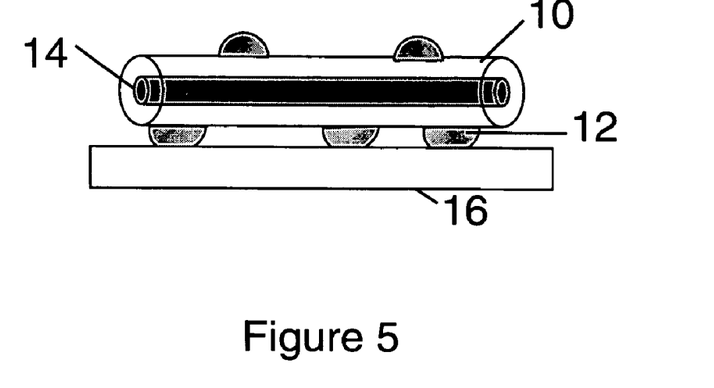
FIG. 5 illustrates an embodiment comprising a porphyrin nanotube with a metallic reduction catalyst within the nanotube core and metal structures on the outer surface for electrically connecting the nanotube composite to an oxidation catalyst.

Another embodiment employs a nanotube composite with the reduction catalyst 14 within the core of the nanotube 10 and metal contact structures 12 on the outer surface of the nanotube, as illustrated in FIG. 5. A reduction catalyst 14 is located within the porphyrin nanotube core. Metals that can serve as the reduction catalyst include, but are not restricted to Pt, Pd, Co, Ni, and alloys thereof. Metals that can serve as the metal contact structures include but are not restricted to Au, Pt, Pd, Ag, Fe, Co, Ni, Cu, and Pb. FIG. 6 is a TEM of a porphyrin nanotube 10 with Pt nanoparticles as the reduction catalyst 14 within the core of the nanotube Gold metal contact structures 12 are affixed to the outer surface of the nanotube. Such structures are suitable for lateral mounting on the surface of an oxidation catalyst 16, as illustrated in FIG. 5.

In some embodiments of the invention, the porphyrin nanotube composite and the oxidation catalyst are connected by binding molecules that are sufficiently short to allow efficient electron transfer between the porphyrin nanotube composite and the oxidation catalyst. One category of binding molecules that are suitable for this application is short-chain thiols. One type of suitable binding molecules comprises molecules which can attach to the oxidation catalyst and provide a free thiol group for attachment to the porphyrin nanotube composite. One category of such molecules are the thiol-substituted silanes. An example of one molecule of this category that is suitable for this application is (3-mercaptopropyl)trimethoxysilane. Silanes of the general formula $R_1R_2R_3SiR'$—SH where $R_i$ is an alkyl group and R' is an alkyl group containing up to 12 carbons are useful. Another category of such molecules are the amino-substituted silanes. An example of one molecule of this category that is suitable for this application is (3-aminopropyl)trimethoxysilane. Silanes of the general formula $R_1R_2R_3SiR'$—$NH_2$ where $R_i$ is an alkyl group and R' is an alkyl group containing up to 12 carbons are useful. The binding molecules are chosen to allow transfer of electrons between the porphyrin nanotube composite and the oxidation catalyst.

Figure 7:
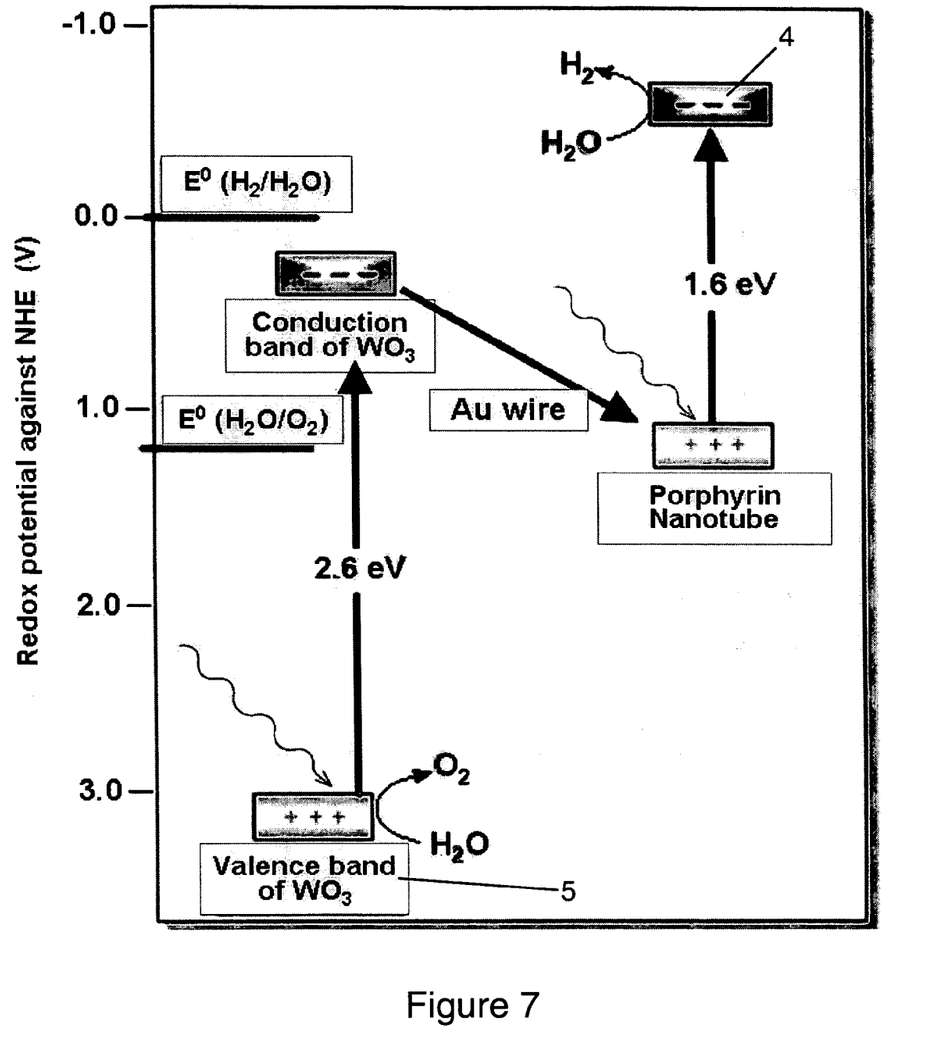
FIG. 7 illustrates an embodiment of the invention showing the electron excitation and transfer steps for a device where reduction is occurring at the nanotube composite and oxidation is occurring at an oxidation catalyst, represented in this figure by $WO_3$.

FIG. 7 illustrates an embodiment of the method that illustrates both the reduction of water to form hydrogen and the oxidation of water to form oxygen. Absorption of a photon by the porphyrin excites an electron out of the valence band of the porphyrin. In FIG. 7, this is illustrated by excitation by a photon with energy of at least 1.6 eV. The reduced Sn porphyrin has a redox potential 1.6 eV higher at approximately −0.6 V that is sufficient to reduce water to produce $H_2$. The reduction of water is facilitated by the reduction catalyst 4, represented by Pt nanoparticles in FIG. 1. In the embodiment illustrated in FIG. 7, absorption of a blue photon (2.6 eV) results in the promotion of an electron into the conduction band of the oxidation catalyst 5, $WO_3$ in this embodiment and in the embodiment illustrated in FIG. 1. The oxidation catalyst $BiVO_4$ can also be used in embodiments of this invention. The hole left in the valence band of $WO_3$ is available and capable of oxidizing water to produce $O_2$, while the electron in the conduction band travels through the gold wire and is available at the porphyrin nanotube to reduce the photoexcited tin porphyrin components of the tube. Alternatively, the photoexcited porphyrin components of the tube can be reduced by another electron source, such as an electron donor species present in solution or an externally applied electron source, such as a power supply.

Figure 8:
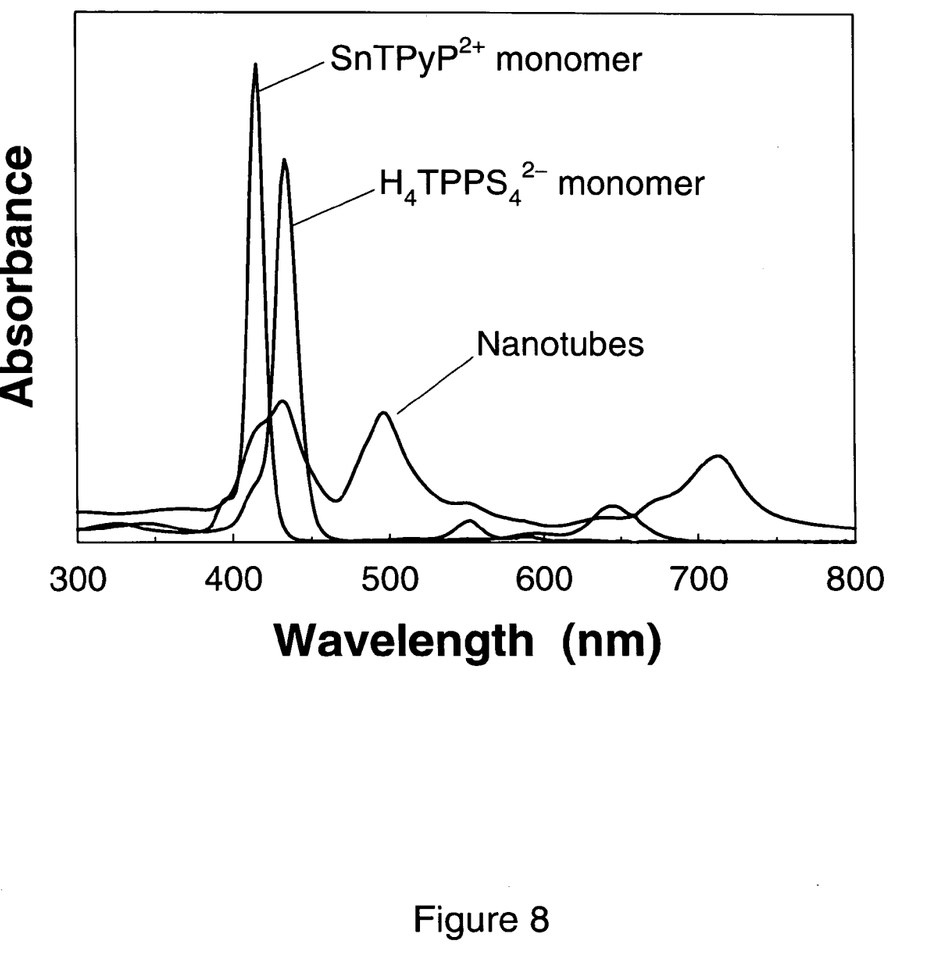
FIG. 8 illustrates a UV-Visible absorption spectra of a colloidal suspension of porphyrin nanotubes and of the constituent porphyrin monomers. $SnTPyP^{2+}$: Sn(IV) meso-tetrakis(4-pyridyl)porphyrin. $H_4TPPS_4^{2-}$: meso-tetrakis(4-sulfonatophenyl)porphyrin.

Efficient use of the solar spectrum is achieved by embodiments of this invention by using at least two porphyrin molecules with different absorption spectrum to form the porphyrin nanotube. An example of the absorption spectra of $SnTPyP^{2+}$ monomer, $H_4TPPS_4^{2-}$ monomer, and the nanotube formed using the two monomers is presented in FIG. 8. In some embodiments, the porphyrin nanotubes are formed by ionic self-assembly of two oppositely charged porphyrin tectons in a 2 to 1 ratio. A metalloporphyrin, such as a Sn porphyrin, serves both as a molecular absorber and as a photocatalytic reaction center. Examples of other metalloporphyrins that are useful include, but are not restricted to, antimony porphyrins, zinc porphyrins, and germanium porphyrins. The second porphyrin is a porphyrin dication, which absorbs at complementary wavelengths in complementary spectral regions and thus can serve as a molecular photon antenna to collect light energy and transmit it by energy-transfer processes to the Sn porphyrin reaction center. In embodiments where the porphyrin nanotube composite is attached to an oxidation catalyst, such as, for example, $WO_3$, $Fe_2O_3$, and $BiVO_4$, the oxidation catalyst absorbs in a gap between the porphyrin bands and at ultraviolet wavelengths, thus utilizing a complementary part of the solar spectrum for the $O_2$ generating part of the spectrum.

This solid-state molecule-based solar photocatalytic conversion approach offers distinct advantages over dye-sensitized nanocrystalline solar cells. For example, the nanotube-semiconductor composite device provides the multi-redox photocatalysts and the necessary organized environments for electron transfer. In addition, no wide band-gap semiconductors with associated sensitizers are required for hydrogen production. The nanotubes function as organic semiconductors, offering an inexpensive alternative to traditional semiconductors for photocatalytic devices.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating hydrogen, the method comprising:
    illuminating a porphyrin nanotube composite with light having a wavelength that is absorbed by a porphyrin nanotube of the porphyrin nanotube composite to generate a plurality of free electrons; and
    reducing at least one hydrogen ion at a reduction catalyst, the reduction catalyst being affixed to the porphyrin nanotube, the step of reducing using the free electrons generated by illuminating the porphyrin nanotube.

2. The method of claim 1, wherein the porphyrin nanotube composite comprises a multimolecular subunit comprising a combination of at least one porphyrin possessing a positive charge and at least one porphyrini possessing a negative charge, the multimolecular subunit forming a set of noncovalent bonds to a set of neighboring multimolecular subunits to form the porphyrin nanotube.

3. The method of claim 2, wherein the at least one porphyrin possessing the positive charge comprises a metalloporphyrin with a coordinated metal ion.

4. The method of claim 3, wherein the coordinated metal ion is selected from the group consisting of tin, antimony, zinc, and germanium.

5. The method of claim 1, wherein the reduction catalysts is a tethered enzyme.

6. The method of claim 1, wherein the reduction catalyst is a metal.

7. The method of claim 6, wherein the metal is selected from the group consisting of Pt, Pd, Co, Ni, and combinations thereof.

8. The method of claim 1, wherein the porphyrin nanotube comprises an interior surface and an exterior surface and the reduction catalyst is affixed to the exterior surface.

9. The method of claim 1, wherein the porphyrin nanotube comprises an interior surface and an exterior surface and the reduction catalyst is affixed to the interior surface.

10. The method of claim 1, wherein a porphyrin of the porphyrin nanotube is selected from the group consisting of an unreduced porphyrin and a reduced porphyrin.

11. A method for generating hydrogen, the method comprising:
    illuminating a porphyrin nanotube composite comprising a porphyrin nanotube with light having a wavelength that is absorbed by the porphyrin nanotube to generate a plurality of free electrons;

reducing at least one hydrogen ion at a reduction catalyst, the reduction catalyst being affixed to the porphyrin nanotube, using the free electrons generated by illuminating the porphyrin nanotube; and oxidizing at least one water at an oxidation catalyst, the oxidation catalyst being electrically connected to the porphyrin nanotube composite to provide a current path between the oxidation catalyst and the reduction catalyst.

12. The method of claim 11, wherein the porphyrin nanotube composite comprises the porphyrin nanotube, the porphyrin nanotube having an outer surface and a hollow interior with an inner surface, a metal nanorod within the hollow interior of the porphyrin nanotube, the metal nanorod having a first end and a second end, and a metal protuberance attached to the first end of the metal nanorod.

13. The method of claim 12, wherein the oxidation catalyst and the porphyrin nanotube composite are connected by a plurality of binding molecules.

14. The method of claim 13, wherein the binding molecules are selected from the group consisting of molecules which can attach to the oxidation catalyst and provide a functional group for attachment to the porphyrin nanotube composite, the functional group being selected from the group consisting of a thiol group and an amino group.

15. The method of claim 13, wherein the binding molecules are selected from the group consisting of (3-mercaptopropyl)trimethoxysilane and (3-aminopropyl)trimethoxysilane.

16. The method of claim 12, wherein the metal nanorod and the metal protuberance comprise a metal selected from the group consisting of Au, Pt, Pd, Fe, Co, Ni, Cu, Pb, and combinations thereof.

17. The method of claim 12, wherein the reduction catalyst is affixed to the outer surface of the porphyrin nanotube.

18. The method of claim 17, wherein the reduction catalyst is selected from the group consisting of Pt, Pd, Co, Ni, and combinations thereof.

19. The method of claim 11, wherein the oxidation catalyst comprises a semiconductor.

20. The method of claim 11, wherein the oxidation catalyst is selected from the group consisting of $WO_3$, $BiVO_4$, $Fe_2O_3$, $TiO_2$, $RuO_2$, $IrO_2$, and $Na_2B_4O_7$.

21. A method for generating hydrogen, the method comprising:

illuminating a porphyrin nanotube composite with light, the porphyrin nanotube composite comprising a porphyrin nanotube and a reduction catalyst affixed to a surface of the porphyrin nanotube, the porphyrin nanotube having an outer surface and a hollow interior with an inner surface and the light having a wavelength that is absorbed by the porphyrin nanotube to generate a plurality of free electrons; and reducing at least one hydrogen ion at the reduction catalyst using the free electrons generated by illuminating the porphyrin nanotube.

22. The method of claim 21, wherein the reduction catalyst is a metal selected from the group consisting of Pt, Pd, Co, Ni, and combinations thereof.

23. The method of claim 21, wherein the porphyrin nanotube composite further comprises a metal deposit on the outer surface of the porphyrin nanotube.

24. The method of claim 23, wherein the metal deposit comprises a metal selected from the group consisting of Au, Pt, Pd, Ag, Fe, Co, Ni, Cu, Pb, and combinations thereof.

25. The method of claim 23, wherein the porphyrin nanotube composite is affixed to an oxidation catalyst, the porphyrin nanotube composite being electrically connected to the oxidation catalyst to provide a current path between the oxidation catalyst and the reduction catalyst.

26. The method of claim 21, wherein the reduction catalyst is located within the hollow interior.

27. The method of claim 21, wherein the reduction catalyst is affixed to the outer surface.

* * * * *